April 14, 1925.
A. A. ROBB
1,533,339
CUSHION TIRE STRUCTURE
Filed Nov. 6, 1922
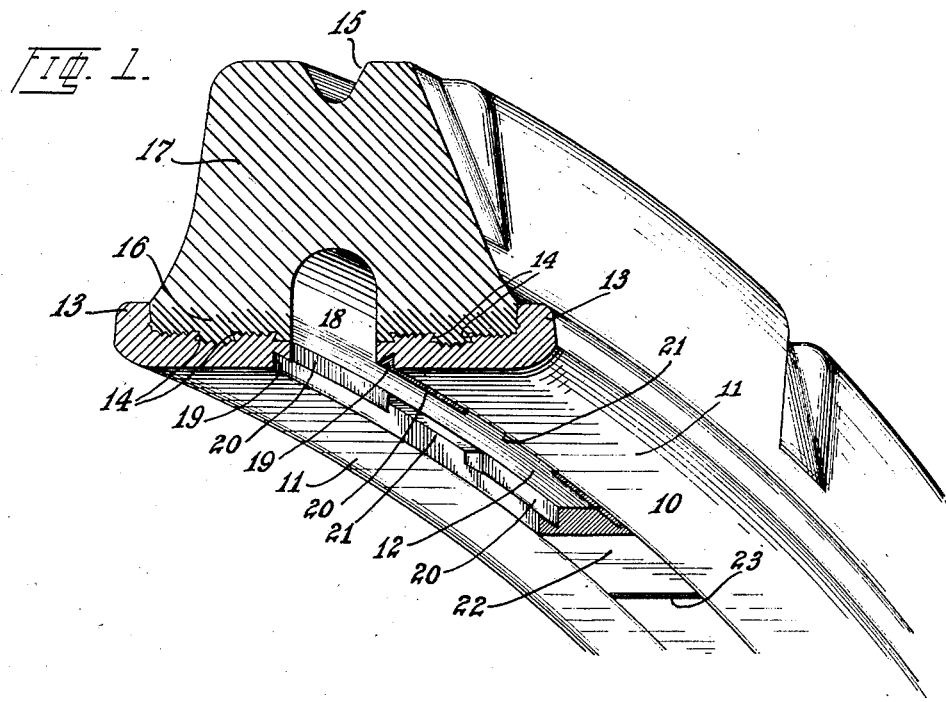
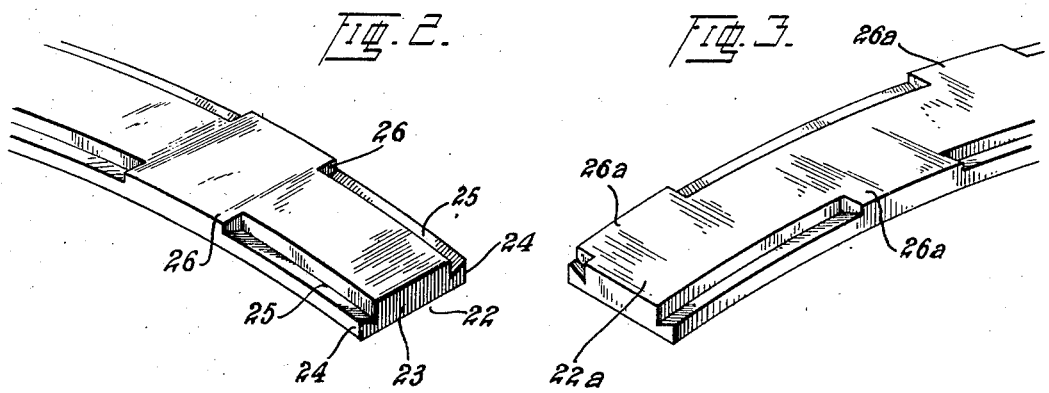
Inventor,
Arthur A. Robb.
By Robert McPierson
Atty.

Patented Apr. 14, 1925.

1,533,339

UNITED STATES PATENT OFFICE.

ARTHUR A. ROBB, OF AKRON, OHIO, ASSIGNOR TO THE B. F. GOODRICH COMPANY, OF NEW YORK, N. Y., A CORPORATION OF NEW YORK.

CUSHION-TIRE STRUCTURE.

Application filed November 6, 1922. Serial No. 599,232.

*To all whom it may concern:*

Be it known that I, ARTHUR A. ROBB, a citizen of the United States, residing at Akron, in the county of Summit and State of Ohio, have invented a certain new and useful Cushion-Tire Structure, of which the following is a specification.

This invention relates to solid tires of the cushion type, particularly to such as comprise a tire body recessed from its inner periphery and vulcanized to the laterally separated halves of a two-part metal base. Its chief objects are to provide improved means for preventing relative movement, both lateral and circumferential, between the two members of the base while the tire is in use, and means such as may be quickly and easily applied to and removed from said tire. A further object is to provide improved spacing means of the character mentioned especially adapted for a pressed-on tire.

Of the accompanying drawings:

Fig. 1 is a sectional perspective view of a cushion tire embodying a preferred form of my invention.

Fig. 2 is a perspective view of a portion of my improved base-retaining or spacing means.

Fig. 3 is a perspective view of a modified form of base-retaining or spacing means.

Referring to the drawings, 10 represents generally an annular metal tire base comprising two annular, side members 11, 11, separated from each other by a complete circumferential slot 12. The side portions 11, 11 are provided respectively with integral side flanges 13, 13 and are formed on their outer peripheries with dove-tailed grooves 14, 14 for anchoring thereto the legs of a hollow cushion tire 15, said tire comprising a foundation layer of hard rubber compound 16 interlocking with the grooves 14 and a body portion 17 of a relatively soft rubber vulcanized to said hard rubber foundation. The tire body 15 is provided with an annular cavity or recess 18, said recess being continuous with the slot 12.

The inner edges of the side portions 11 adjacent the slot 12 are half dove-tailed or undercut as at 19, 19 to provide overhanging portions 20, 20, the circumferential continuity of said overhanging portions being interrupted at regular intervals by cut away portions or recesses shown at 21, 21. As shown in Fig. 1, the overhanging portions 20 and recesses 21 of the two side portions 11 are preferably aligned so that the like parts of the two base members are opposite each other.

An annular retaining member or spacing ring 22 (Fig. 2), transversely split as at 23, (Fig. 1) is formed with its edge portions complemental to the adjacent edge portions of the base members 11, said ring thus having half dove-tailed portions 24, 24 adapted to fit in the grooves 19 and intersected at intervals by lugs, 26, 26 adapted to fit in the recesses 21 of the base members.

The retaining ring 22, being so formed, seats within the slot 12 between the base portions 11 of the tire, its inner periphery lying flush with the inner periphery of said base portions. The undercut projections 24, 24 of the ring engage the overhanging portions 20, 20 of the tire base to prevent relative lateral movement of the base members 11, and the lugs 26 interfit with the slots 21, to prevent relative rotative movement between said base members.

The modified form of retaining ring, 22$^a$, shown in Fig. 3 is provided with lugs 26$^a$, 26$^a$ similar to the lugs 26, but with each lug of a circumferential series lying at an intermediate position with respect to the lugs on the opposite edge of the ring. Such modified form of ring may be used with tire base members such as are shown in Fig. 1, the latter being so indexed with relation to each other, in the building of the tire, that their recesses 21 will be staggered so as to receive the staggered lugs 26$^a$.

In mounting a tire constructed as here shown the retaining ring is contracted, as it may be by reason of the transverse split 23, inserted between the base members 11, and permitted to spring out into interlocked relation therewith, its relation to the base members being as shown in Fig. 1. The assembled structure may then be mounted on the permanent rim or felloe of a vehicle wheel in pressed-on relation thereto, and the inner face of the spacing ring being substantially flush with the inner faces of the base members, said ring is securely held in position and in interlocked relation to the tire base members as to both circumferential and lateral movement, so as to prolong the useful life of the tire by preventing displacement of the base members. The interlocking portions may be formed in any suitable manner, preferably by hot-rolling them in the strip stock from which the base members and the ring are made.

This construction makes it possible to provide a detachable interlocking connection between the rim members, which can be easily applied and removed and which is cheaper than a permanent connection such as spot-welding or upsetting of the metal, since it dispenses with one or more operations additional to the rolling.

Modifications other than the one described may be resorted to without departing from the scope of my invention, and I do not wholly limit my claims to the specific construction shown.

I claim:

1. A cushion tire structure comprising a pair of annular, spaced-apart base members, an arched rubber tire body having its legs respectively vulcanized to said base members, and a transversely-split spacing and locking ring mounted between and interfitting with said base members, and so interlocked therewith as to prevent circumferential and lateral relative movement between said base members.

2. A cushion tire structure comprising a pair of annular, spaced-apart base members, an arched rubber tire body having its legs respectively vulcanized to said base members, and a transversely split spacing ring mounted between said base members, and substantially flush therewith at the inner periphery, said base members and ring being formed with portions interlocking them as to both circumferential and lateral relative movement.

3. A cushion tire and rim structure of the pressed-on type comprising a pair of spaced-apart base members, a cushion of rubber vulcanized to said base members and spanning their intervening space, and a transversely-split locking ring interposed between said base members, the adjacent, inner peripheral edges of the base members and the outer peripheral edges of the ring being formed with circumferentially and laterally interlocking portions.

4. A cushion tire and rim structure of the pressd-on type comprising a pair of annular, spaced-apart base members, an arched rubber tire body having its legs respectively vulcanized to said base members, and a transversely-split spacing and locking ring mounted between and substantially flush with said base members, the pairs of adjoining edges of the base members and ring being complementally formed with interfitting, alternate, undercut and lug portions interlocking the ring with the base members as to both circumferential and lateral relative movements.

In witness whereof I have hereunto set my hand this 2 day of November, 1922.

ARTHUR A. ROBB.